United States Patent [19]

Stark

[11] 4,125,353

[45] Nov. 14, 1978

[54] INJECTION-MOLDING INSTALLATION, PARTICULARLY FOR THE PRODUCTION OF FOOTWEAR

[76] Inventor: Alfred Stark, Friedhofgasse 9, Kittsee (Burgenland), Austria

[21] Appl. No.: 795,442

[22] Filed: May 10, 1977

[30] Foreign Application Priority Data

May 10, 1976 [AT] Austria ............................... 3420/76

[51] Int. Cl.² ........................... B29F 1/00; B29H 7/08
[52] U.S. Cl. ........................... 425/576; 425/119
[58] Field of Search ................. 425/119, 129 S, 576

[56] References Cited

U.S. PATENT DOCUMENTS

| | | | |
|---|---|---|---|
| 3,302,243 | 2/1967 | Ludgwig | 425/119 X |
| 3,522,632 | 8/1970 | Wessel | 425/119 |
| 3,555,609 | 1/1971 | Chu et al. | 425/119 |
| 3,591,893 | 7/1971 | Vicini | 425/129 SX |
| 3,663,139 | 5/1972 | Robbins et al. | 425/119 X |
| 3,692,449 | 9/1972 | Niklas | 429/129 SX |
| 3,709,973 | 1/1973 | Maltby | 425/129 SX |
| 3,915,608 | 10/1975 | Hujik | 425/119 |

FOREIGN PATENT DOCUMENTS

| | | | |
|---|---|---|---|
| 1,187,786 | 2/1965 | Fed. Rep. of Germany | 425/119 |
| 1,371,131 | 7/1964 | France | 425/119 |
| 1,343,405 | 1/1974 | United Kingdom | 425/119 |

*Primary Examiner*—J. Howard Flint, Jr.
*Attorney, Agent, or Firm*—Karl F. Ross

[57] ABSTRACT

A machine for the production of footwear by injection molding comprises a multiplicity of shoe molds on a common carrier, such as a turntable, moving successively past a core-insertion station and an injection station. At the insertion station, a mold core in the form of a last is lowered into an open shoe mold which then moves into alignment with an extruder at the injection station. The lowerable core support at the insertion station carries a feeler which, by coming to rest on an aligned mold or on the mold carrier, limits the descent of the core into the mold.

4 Claims, 2 Drawing Figures

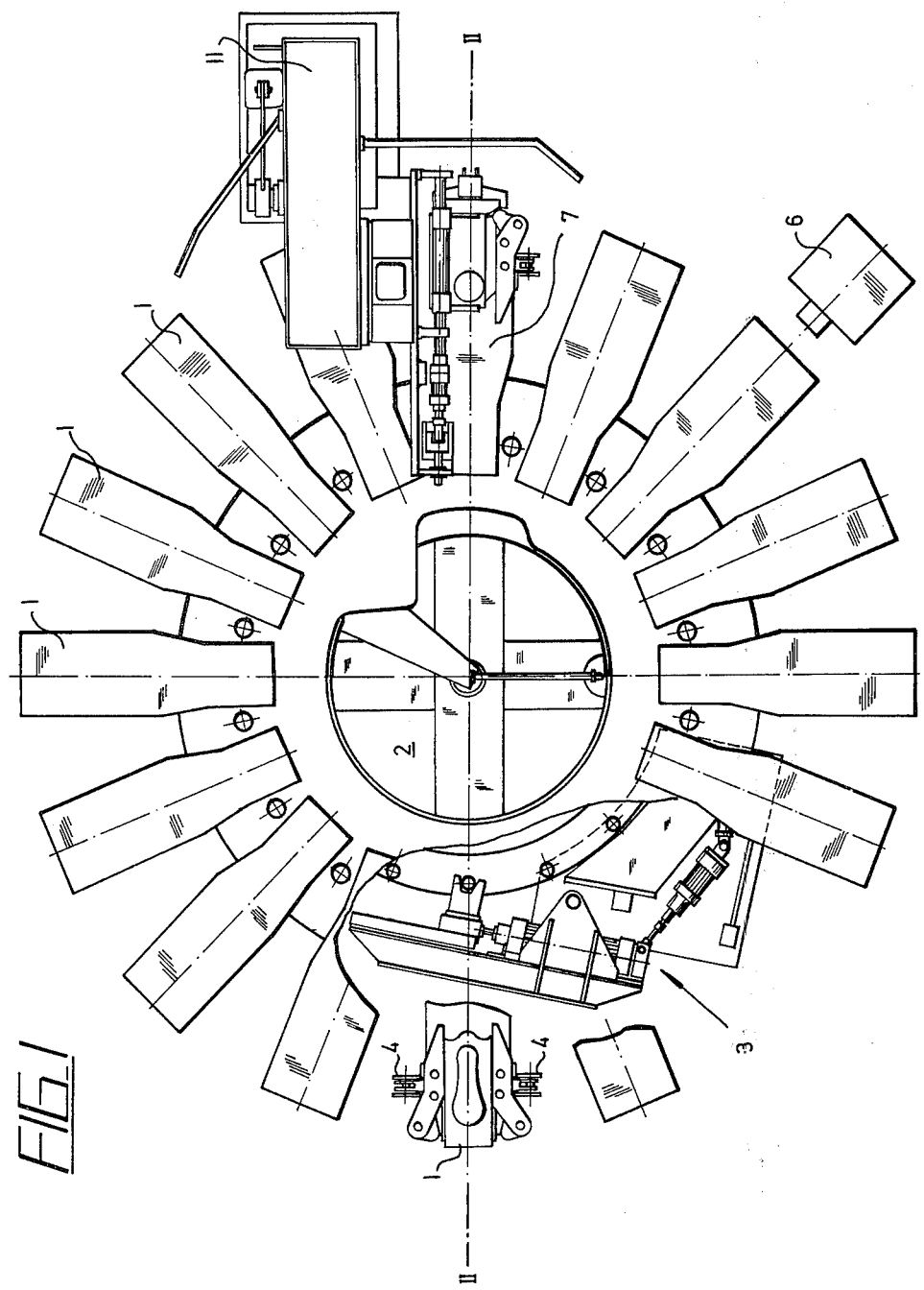

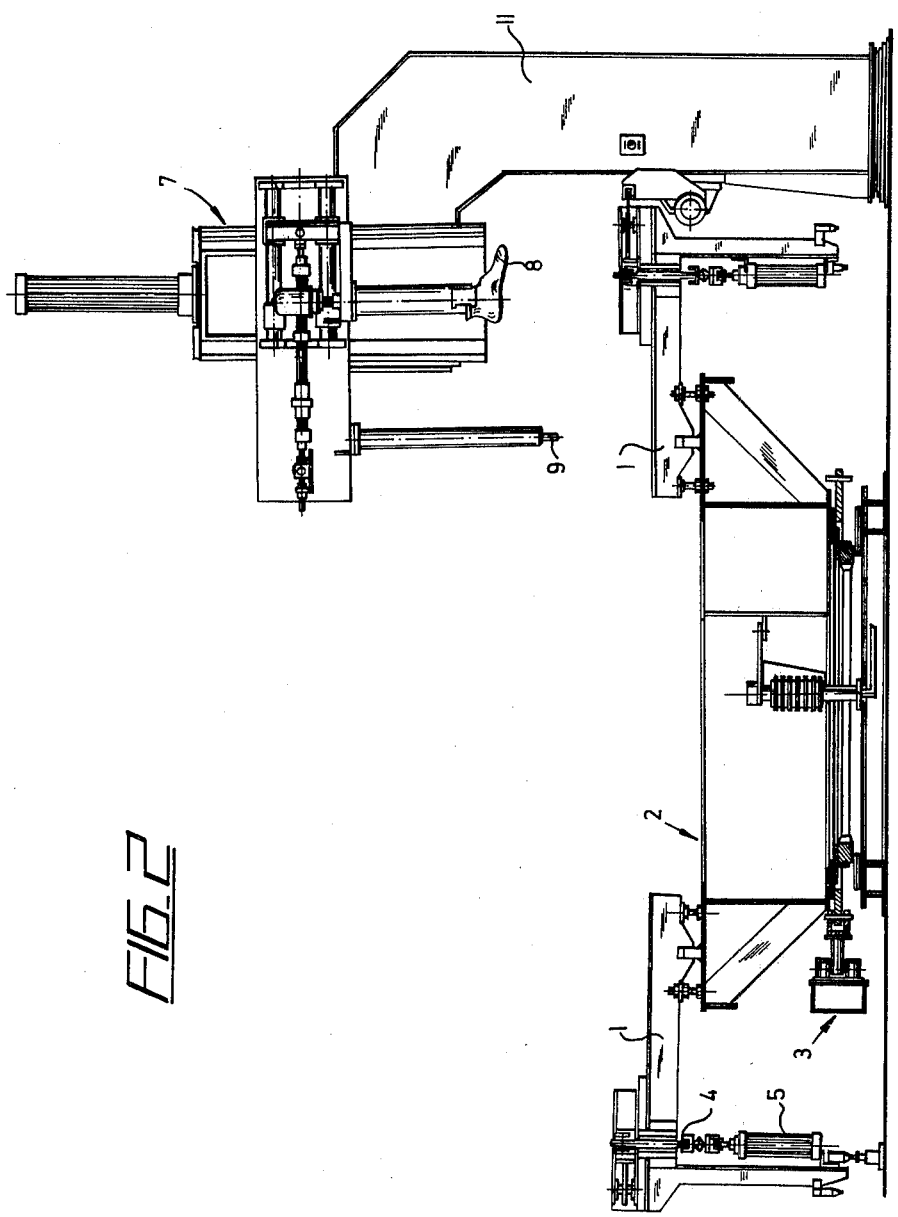

INJECTION-MOLDING INSTALLATION, PARTICULARLY FOR THE PRODUCTION OF FOOTWEAR

My present invention relates to an injection-molding installation, particularly for the production of footwear, with several openable and closable molds, possibly together with a bottom plunger, arranged e.g. on a round or elongate table, with mold cores, specifically lasts, insertable into the molds by means of core carriers, the molds being connectable to an extruder or the like.

Injection-molding installations, particularly for the production of footwear, are known in which there are assigned to an extruder several molds each with a bottom plunger and with a mold core, the latter being constructed as a last and connectable to a core carrier with which it can be displaced into or out of the mold. Thus, a respective mold carrier is assigned to each mold. Such installations are designed either as a mold line along which the extruder is movable and connectable to the individual molds, or as a round-table installation in which the molds are mounted on a rotatable turntable and are moved stepwise past the stationary extruder.

The object of my invention is the simplification of such installations, with a saving of material, installation components and associated control elements.

This aim is accomplished with an injection-molding installation of the type initially outlined in that only one core is assigned to several molds.

According to a further advantageous feature of my present invention the mold carrier can be constructed as a turntable on which the molds are arranged in star-like shape. Alternatively, the mold carrier can be designed as an elongate table on which the molds are mounted next to one another. I also prefer to make the core carrier vertically elevatable and lowerable, as by further advantageous swingably mounting it in a substantially vertical plane. Preferably, the core carrier is provided with a feeler controlling the lowering of the core carrier to the molds.

My invention will now be described in more detail with reference to the accompanying drawing in which:

FIG. 1 is a schematic top view of a turntable-type injection-molding installation embodying my invention; and FIG. 2 is a cross-sectional view along the line II — II of FIG. 1.

According to the drawing, an injection-molding installation designed for the production of footwear and comprises a number of molds 1 which are mounted on a mold carrier 2 rotatable about a vertical axis and constructed as a turntable. This mold carrier 2 is transportable via a stepping drive 3 by an angle corresponding to the mold distance. To all molds 1, which in the illustrated embodiment are openable and closable by means of a linkage 4 and a working cylinder 5 and are provided with a bottom plunger (not shown), there is assigned a stationary extruder 6 to which the molds 1 are connectable one at a time and which constitutes an injection station.

Mounted on a frame 11 is a single core-insertion station comprising a core support 7 to which a mold core 8, designed as a last, is secured in a detachable and interchangeable manner. In the illustrated embodiment the core support 7 is vertically elevatable and lowerable, the mold core 8 being vertically inserted from above into the respective mold 1 whereupon its support can be extracted upwardly from the mold. Alternatively, the core support can be mounted swingably in a vertical plane passing substantially through the axis of the mold carrier 2.

The lowering of the mold core 8 could be carried out to a predetermined extent from the upper limiting position of support 7, yet I prefer to dispose the mold core 8 at a selectable distance from the bottom or the bottom plunger of the mold 1, for which purpose an overhanging part of core support 7 is provided a feeler 9 which is jointly displaceable with that support and, for the maintenance of that distance, coacts with a contact surface on the mold 1 or the mold carrier 2 and is connected to the control mechanism for the core support 7.

Thus, I am able to eliminate the extra core carriers of eliminated with reference to as well as the corresponding control devices for these core carriers, their mounting and their maintenance, with considerable reduction in the susceptibility of the entire installation to repairs.

I claim:

1. In a machine for producing footwear, in combination:
   a movable mold carrier;
   a multiplicity of openable and closable molds spacedly disposed on said mold carrier;
   a single core-insertion station and a single injection station adjacent said mold carrier;
   drive means coupled with said mold carrier for successively aligning each of said molds first with said core-insertion station and then with said injection station; and
   support means at said core-insertion station operable upon the alignment of a mold therewith for introducing a last-shaped core from above into the aligned mold prior to a displacement of the latter to said injection station for the introduction of molding material into same.

2. The combination defined in claim 1 wherein said support means has a part overhanging said mold carrier, further comprising feeler means on said overhanging part engageable with said mold carrier for limiting the descent of said core into an aligned mold.

3. The combination defined in claim 2 wherein said feeler means is positioned for contact with the aligned mold.

4. The combination defined in claim 1 wherein said mold carrier is a turntable.

* * * * *